Dec. 29, 1936. W. LAURIE 2,066,206
CONVEYER
Filed June 5, 1936
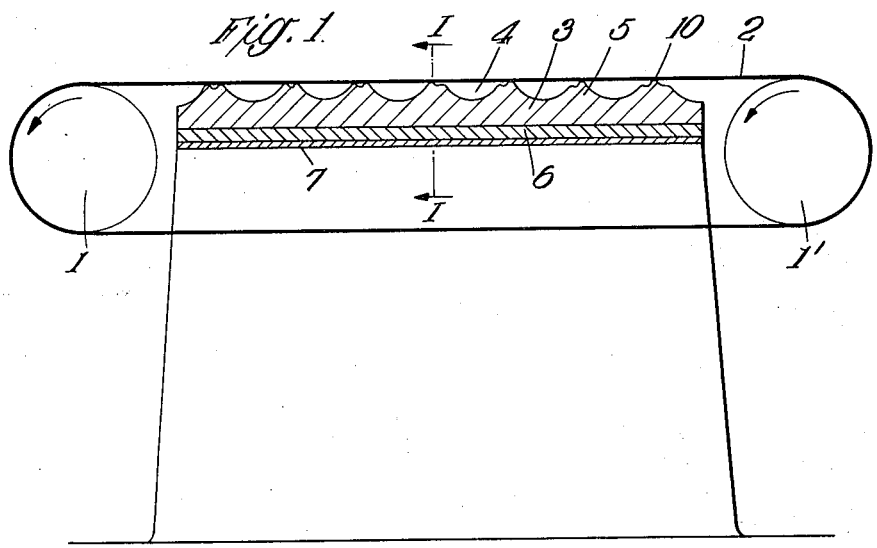
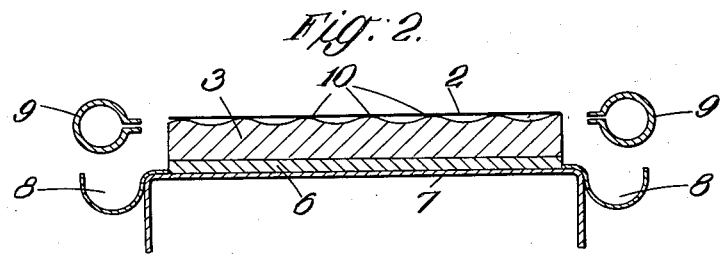
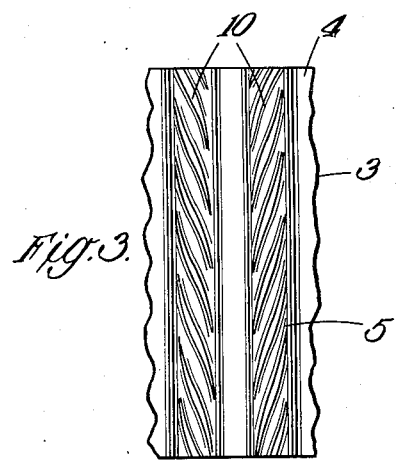
INVENTOR
WILLIAM LAURIE
By Emil Bönnelycke
ATTORNEY Patented Dec. 29, 1936

2,066,206

UNITED STATES PATENT OFFICE 2,066,206

CONVEYER

William Laurie, London, England

Application June 5, 1936, Serial No. 83,803
In Great Britain May 23, 1935

8 Claims. (Cl. 198—184)

This invention relates to endless band conveyers.

The use of stainless steel as a material for conveyer bands is known and it is likewise known to convey articles such as food products on a conveyer band supported on a wood or metal surface.

The use of wood is, however, not hygienic especially where food products are concerned. Thus for example when containers of hot jam or milk are conveyed on a conveyer band supported by a wood surface some of the material frequently becomes spilled upon the wood and forms thereafter a very satisfactory culture medium for bacteria thereby giving rise to unhygienic conditions. Moreover, the co-efficient of friction between metal and wood is fairly high.

It is an object of this invention to provide a conveyer particularly suitable for conveying food products which is hygienic, and preferably resistant to rusting and also to corrosion by acids, etc. and in which the co-efficient of friction between the conveyer band and its support is low.

According to the present invention the endless band conveyer comprises an endless conveyer band, a support for said band and means for moving said band, the surface of the said support being provided with open-ended depressions to reduce the contact surface with the band and being made of material between which and the material of the said band there is a low coefficient of friction. Instead of the open-ended depressions, the support may be provided with spaced raised portions contacting with the band, the spaces between said raised portions being in the form of open-ended channels.

The conveyer band may consist of stainless steel, Monel metal, steel or other preferably non-corrosive metals or metallic alloys such as brass or bronze, e. g. phosphor bronze. The surface, at least, of the support may consist of glass, porcelain, vitreous enamel, Monel metal, steel, other preferably non-corrosive metals or metal alloys such as brass or bronze, e. g. phosphor bronze between which and the material of the conveyer band there is a low co-efficient of friction.

Water or other lubricant may be present between the band and the supporting surface.

The supporting surface may, for example be provided with ribs and channels which when using glass may be formed by casting. The ribs, if desired, may have channels therein. Alternatively for example the supporting surface may be provided with diamond-shaped raised portions, for example, by casting or rolling on the glass or metal alloys such as brass or bronze thus providing diagonal channels which may be left free or through which water or other lubricant may flow. Another example of a suitable supporting surface is a plate, for example of glass, provided with raised hemispherical portions.

The use of water as a lubricant is particularly advantageous as it also serves to clean the conveyer.

The conveyer band may be conveniently driven by means of a pulley which, for example, may be coated with vulcanized rubber or gutta percha between which substances and the conveyer band, for instance, of stainless steel there is considerable friction. The use of these substances also has the advantage that the pulley easily takes up the joint in the band without causing shaking.

The invention will now be described by way of example with reference to the accompanying drawing in which:

Figure 1 shows an elevation partly in section of the conveyer,

Figure 2 shows a section on the line 1—1 of Figure 1, and

Figure 3 shows a top plan view of the supporting surface.

Referring to the drawing 1 and 1' are pulleys for driving the conveyer, 1 being the driver and 1' the follower. The surface of pulley 1 is covered with a layer of rubber and 1' may be similarly coated if desired. The conveyer band 2 of stainless steel runs over the glass supporting surface 3 which is provided with channels 4 and ribs 5. The support 3 is mounted on a resilient foundation 6, for example of rubber, which is carried by a steel frame 7. Water, for lubrication is supplied by jets 9 and is collected in troughs 8 (see Figure 2). The ribs 5 are provided with diagonal channels 10 (see Figure 3).

The conveyer band may be provided with perforations to reduce friction and provide easy circulation of the cleansing water.

For conveying pots of jam or milk the conveyer band may be conveniently of 26 gauge stainless steel and about 4 inches in width.

The following comparative experiments show the advantageous properties of the conveyers produced according to the present invention with regard to the reduction of friction.

A conveyer as shown in the accompanying drawing and as hereinbefore described and a known rubber belt conveyer supported on ball-bearing rollers were loaded with equal weights and driven under equal conditions using similar pulleys in each case. When the power was switched off the conveyer according to the present invention travelled on a distance between 18 and 24 inches, whereas the known rubber belt conveyer came to rest within six inches. The conveyers according to this invention also have the advantages of being hygienic, non-corrosive and easily cleansed.

What I claim is:

1. An endless band conveyer comprising an endless conveyer band, a support for said band, and means for moving said band, the surface of said support being provided with open-ended depressions to reduce the contact surface with the band and being made of material between which and the material of the said band there is a low coefficient of friction.

2. An endless band conveyer comprising an endless metal conveyer band, a support for said band, and means for moving said band, the surface of said support being provided with spaced raised portions contacting with the band and being made of a material selected from the group consisting of glass, porcelain, vitreous enamel, synthetic resin, non-corrosive metals or metallic alloys between which and the material of the said band there is a low coefficient of friction, the spaces between said raised portions being in the form of open-ended channels.

3. An endless band conveyer comprising an endless metal conveyer band, a support for said band, and means for moving said band, the surface of said support being provided with open-ended depressions to reduce the contact surface with the band and being made of a material selected from the group consisting of glass, porcelain, vitreous enamel, synthetic resin, non-corrosive metals or metallic alloys between which and the material of the said band there is a low coefficient of friction.

4. An endless band conveyer comprising an endless conveyer band, a support for said band, and means for moving said band, the surface of said support being provided with ribs and channels, the said ribs having diagonal channels therein, and being made of material between which and the material of the said band there is a low coefficient of friction.

5. An endless band conveyer comprising an endless conveyer band, a support for said band, means for moving said band, the surface of said support being provided with spaced raised portions contacting with the band and being made of material between which and the material of the said band there is a low coefficient of friction, the spaces between said raised portions being in the form of open-ended channels, and means for introducing a lubricant between said band and said support.

6. An endless band conveyer comprising an endless conveyer band, a support for said band, means for moving said band, the surface of said support being provided with open-ended depressions to reduce the contact surface with the band and being made of material between which and the material of the said band there is a low coefficient of friction, and means for introducing a lubricant between said band and said support.

7. An endless band conveyer comprising an endless conveyer band of stainless steel, a glass support for said band, two pulleys for moving said band and a plurality of jets for introducing a lubricant between said band and said support, the surface of said support being provided with ribs and channels, the said ribs having diagonal channels therein.

8. An endless band conveyer comprising an endless conveyer band, a support for said band, and means for moving said band over the surface of said support, the surface of said support being provided with spaced raised portions contacting with the band and having open-ended depressions between the raised portions, said band and the portions of the support in contact with the band being made of materials between which there is a low coefficient of friction.

WILLIAM LAURIE.